(12) United States Patent
Büns

(10) Patent No.: US 8,278,777 B2
(45) Date of Patent: Oct. 2, 2012

(54) APPARATUS FOR GENERATING ELECTRICAL ENERGY FROM A FLOWING MEDIUM

(75) Inventor: Heinrich J. Büns, Langenhagen (DE)

(73) Assignee: AP Aero Power Ltd., Sileby Loughborough (GB)

( * ) Notice: Subject to any disclaimer, the term of this patent is extended or adjusted under 35 U.S.C. 154(b) by 442 days.

(21) Appl. No.: 12/380,279

(22) Filed: Feb. 25, 2009

(65) Prior Publication Data
US 2009/0267351 A1    Oct. 29, 2009

(30) Foreign Application Priority Data

Apr. 29, 2008   (DE) .................... 10 2008 022 139

(51) Int. Cl.
*F03D 9/00*    (2006.01)

(52) U.S. Cl. ........................................... 290/55; 290/44

(58) Field of Classification Search .................. 290/1 R, 290/43, 44, 54, 55
See application file for complete search history.

(56) References Cited

U.S. PATENT DOCUMENTS

| | | | | |
|---|---|---|---|---|
| 4,036,916 | A * | 7/1977 | Agsten ........................... | 261/109 |
| 5,512,788 | A * | 4/1996 | Berenda et al. ................. | 290/55 |
| 6,365,985 | B1 * | 4/2002 | Cohen ............................. | 290/55 |
| 7,112,893 | B1 * | 9/2006 | Villanueva ...................... | 290/55 |
| 7,208,846 | B2 * | 4/2007 | Liang ............................. | 290/1 R |
| 7,362,004 | B2 * | 4/2008 | Becker ........................... | 290/55 |
| 2003/0057708 | A1 * | 3/2003 | Wu ................................. | 290/55 |
| 2009/0146425 | A1 * | 6/2009 | Widisky .......................... | 290/44 |

\* cited by examiner

*Primary Examiner* — Tho D Ta
(74) *Attorney, Agent, or Firm* — Lucas & Mercanti, LLP; Klaus P. Stoffel

(57) ABSTRACT

An apparatus for generating electrical energy includes at least one generator connected to a drive device. The drive device includes at least one guide element for transforming the energy of a flowing medium into a rotational movement. The guide element is arranged in the flow path of the heated exhaust air coming from at least one heat exchanger.

12 Claims, 3 Drawing Sheets

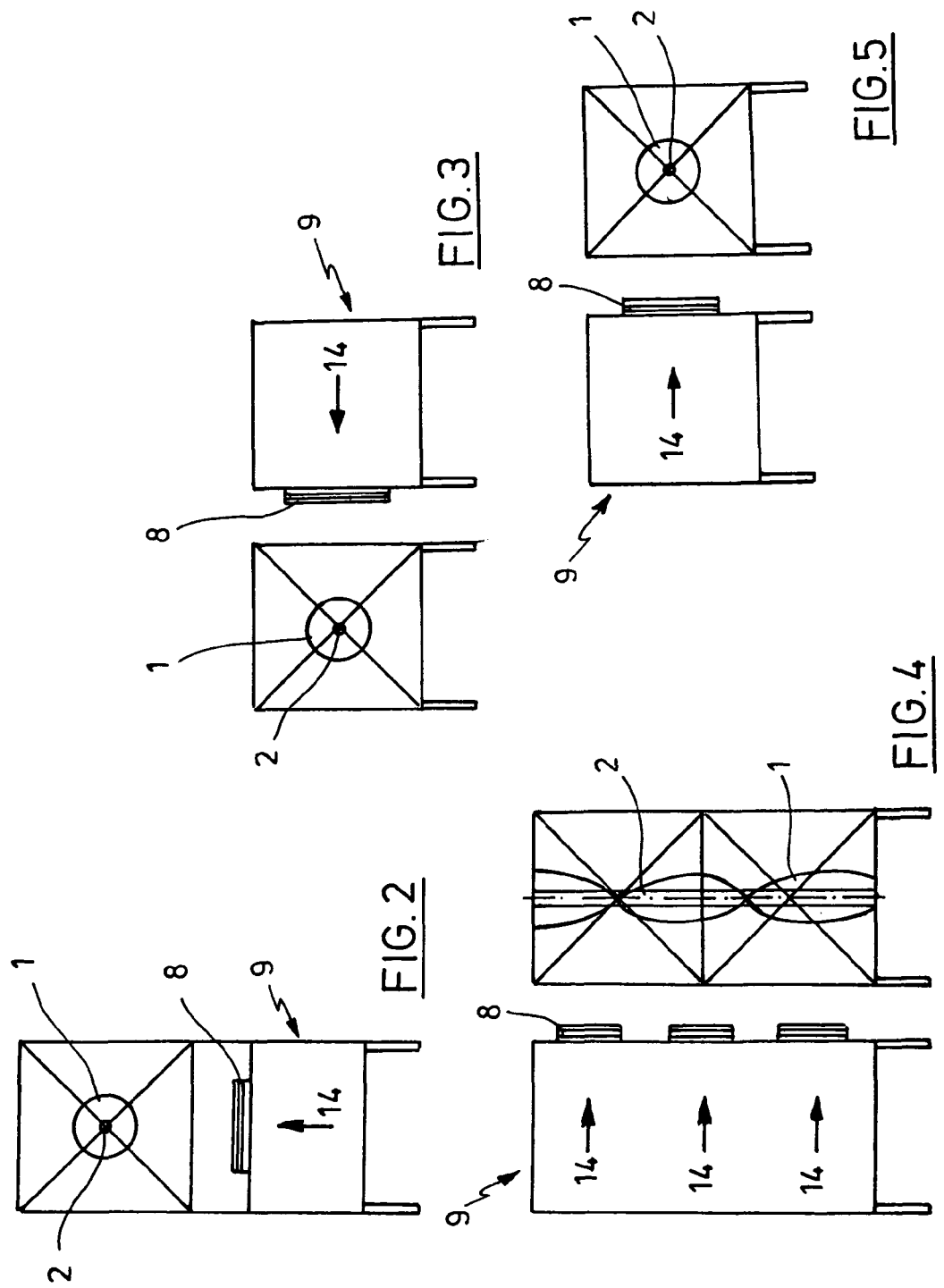

APPARATUS FOR GENERATING ELECTRICAL ENERGY FROM A FLOWING MEDIUM

BACKGROUND OF THE INVENTION

1. Field of the Invention

The present invention relates to an apparatus for generating electrical energy, in which at least one generator is connected to a drive device which includes at least one guide element for transforming the energy provided by a flowing medium into a rotational movement.

2. Description of the Related Art

Apparatus of this type are designed in the form of so-called wind power converters or turbines, which are actuated by the flow of water in a river, for example, or by the flow caused by the tides. These systems are typically large-scale systems and are suitable for use only in especially favorable application sites. The installation and operation of these systems are therefore associated with considerable investment and maintenance costs.

SUMMARY OF THE INVENTION

The object of the present invention is to provide an apparatus of the type indicated above in such a way that decentralized application at many different types of application sites is facilitated.

This object is achieved according to the invention in that the guide element is arranged in the flow path of the heated exhaust air coming from at least one heat exchanger.

Such heat exchangers are used in conjunction with many different types of cooling systems in which waste heat from buildings or production processes is discharged into the environment. An especially common area of application of these heat exchangers is found in conjunction with central air-conditioning systems, which are used throughout the world in residential, office, and other types of buildings. These air-conditioning systems are typically equipped with condenser units, i.e., so-called recoolers, which are often installed on the roofs of tall and even very tall buildings.

These condenser units usually consist of a coolant circuit, a plurality of usually metallic heat-exchange surfaces, and a blower, which blows ambient air at the heat-exchange surfaces. Extremely powerful blowers are used for this purpose. They are able to generate very large and directionally stable movements of the air.

Both the blowers and the air-conditioning systems are typically operated by electric power, which means that considerable maintenance costs are incurred. The heated air flowing away from the heat-exchange surfaces is typically discharged directly into the environment. Through the inventive arrangement of the guide element of the generator in the flow path of this heated exhaust air, it is possible to recover at least some of the energy contained in the flow energy of the exhaust air and also at least some of the thermal energy being transported by the exhaust air.

Depending on local conditions, it is at least possible to recover at least some of the electrical energy required to operate the air-conditioning system or the blowers. In combination with the wind intensities present especially in the area of tall buildings and/or under exploitation of the force of the updraft, which, if the flow routes are laid out appropriately, the heated exhaust air can develop versus the surrounding cooler air, it is also possible to feed energy back into a power grid at least for certain periods of time.

The present invention thus offers both ecological advantages through reduction of the heating of the environment and economic advantages through reduction of the operating costs of the air-conditioning system or similar machinery.

A compact design can be obtained by mounting the guide element vertically above the heat exchanger.

In cases where the air is directed essentially horizontally at the heat exchanger, it is also possible for the guide element to be mounted vertically next to the heat exchanger.

To take advantage of the updraft effects in the case of a horizontal flow of air at the heat exchanger, it is also possible for the guide element to be mounted vertically above and also laterally offset from the heat exchanger and to be connected to the exchanger by a flow guide element.

According to a preferred embodiment, the heat exchanger is designed as the cooler of an air-conditioning system.

An especially large potential for effective use is achieved by equipping the air-conditioning system with at least one blower.

By installing a gearbox between the generator and the drive device, bearing friction in the area of the wind power converter can be decreased.

It is possible in this way in particular for the gearbox to comprise a speed ratio suitable for connecting a slow-turning drive device to a fast-turning generator.

If the apparatus comprises a photovoltaic system, it becomes easier to generate energy at a level which remains uniform over time under changing application conditions.

Uniform operation and high system availability are improved even more by providing the apparatus with an energy storage unit.

According to one embodiment, the storage unit is designed to store electrical energy.

Energy can be stored in material form by constructing the storage unit to produce and to store hydrogen.

Energy production can be increased even more by constructing the drive device as a wind converter for taking advantage of natural wind.

Additional energy potential is realized by constructing the drive device as a wind converter for taking advantage of thermal updrafts.

A basic configuration which is low in cost and adaptable to different application requirements is provided by implementing a modular design.

The performance potential can be increased by connecting at least two modules for generating electrical energy to each other.

The flexibility of the system can be increased by connecting the wind power system to an electronic control unit.

In particular, it is also possible to configure the control unit so that it automatically controls a brake on the wind converter.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the Drawing

FIG. 2 is a schematic diagram of a first possible arrangement of the wind power system in conjunction with a condenser unit;

FIG. 3 shows a modification of the embodiment in FIG. 2;

FIG. 4 shows another modified embodiment;

FIG. 5 shows yet another modification of the embodiment; and

DETAILED DESCRIPTION OF THE INVENTION

Figure 1:
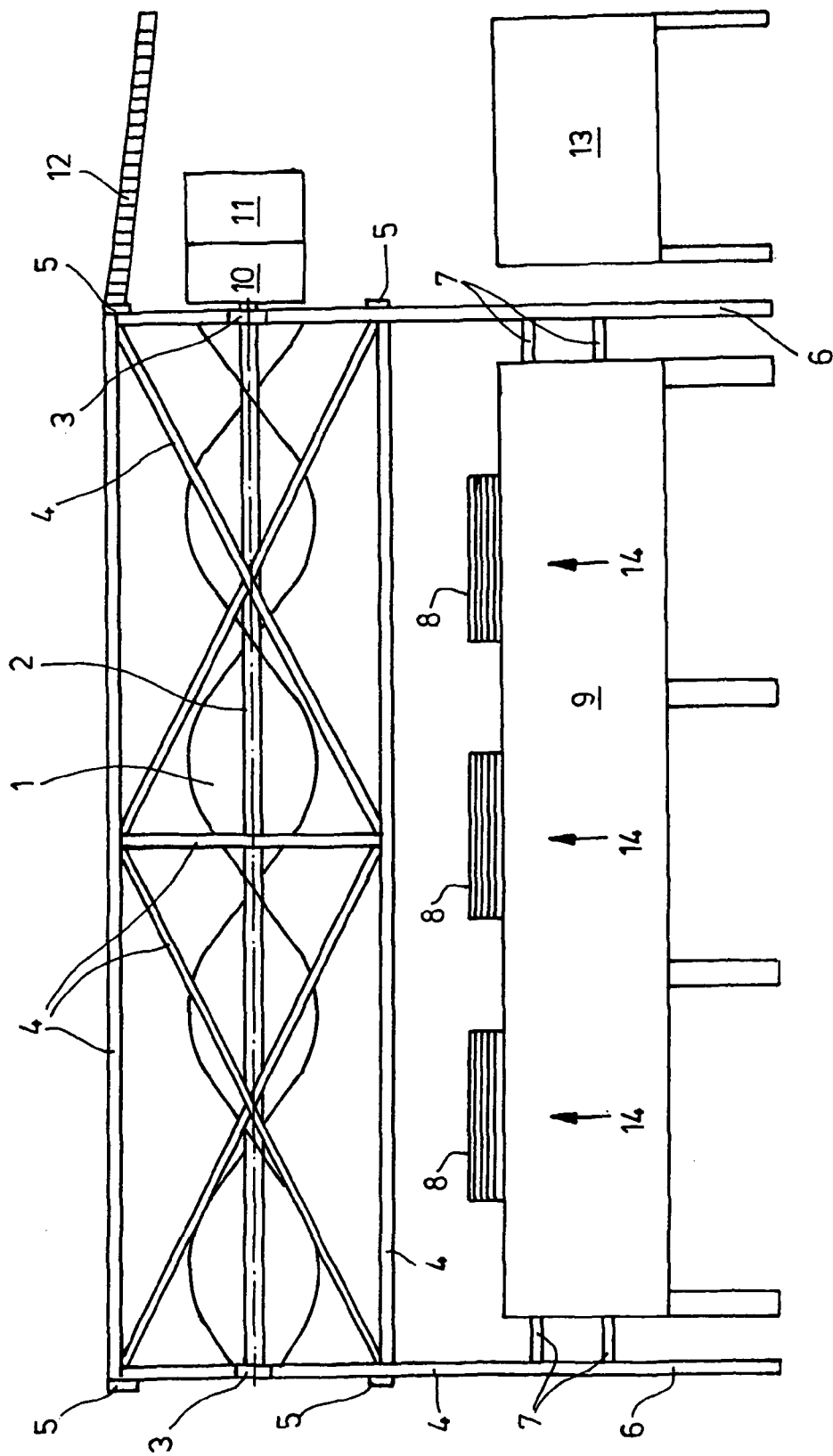
FIG. 1 is a schematic diagram of a wind power system in conjunction with a condenser unit.

According to the embodiment in FIG. 1, the wind power system is a modular, self-supporting unit, the external form of which is defined by sectional housing bars 4, which are connected to each other. The sectional housing bars form a stable housing for enclosing and supporting a rotatable axle 2, on which a wind converter 1 is mounted. The axle 2 is preferably guided in at least two bearings 3.

The wind converter 1 can be constructed in such a way that it combines the properties of a Darrieus rotor with those of a Savonius rotor. The wind converter 1 is driven by the movement of a flow medium (air) indicated by the flow direction arrow 14, this movement being produced at least partially by the blowers 8. It is also possible to have the wind converter 1 be driven by the effect of natural wind or by the air which rises as a result of elevated temperature.

Depending on the existing flow direction, the wind power system can generate power in either a vertical or a horizontal position. An essentially vertical flow direction in the area of the wind converter 1 has been found to be especially advantageous, because additional benefit can thus be derived from the thermal updraft of the cooling air.

The rotatable axle 2 is connected by a gearbox 10 to a generator 11. The gearbox 10 preferably has a high speed conversion ratio, so that a slow rotational speed of the wind converter 1 is transformed into a high rotational speed of the generator 11. The generator 11 serves to generate electrical energy, where, depending on the construction selected in the concrete case, direct current, alternating current, or three-phase current can be generated. By means of appropriate electrical converters, nearly any desired transformation into other energy forms can be accomplished regardless of the original form in which the energy is provided by the generator 11.

On an exterior side of the housing of the wind power system, fastening flanges 5 are provided, which are used to hold and/or to attach horizontally and/or vertically adjustable support stand sections 6. The support stand sections 6 facilitate the installation and/or attachment of the condenser unit (heat exchanger) 9 to or on buildings or on parts of buildings or other structures. In addition, the support stand sections 6 provide a secure base and/or point of attachment for the wind power system. The condenser unit 9 can be supported on the support stand sections 6 by fastening parts 7. Inside the condenser unit 9, the blowers 8 typically generate a flow direction 14.

The wind power system can be set up and/or mounted horizontally, for example, directly above the air outlets of the blowers 8 of one or more condenser units 9. This is shown in FIG. 2. It is also possible to provide an arrangement in which the wind power system is set up directly next to the air outlets of the blowers 8, on either the left or right, as shown in FIG. 3 and FIG. 5. According to the embodiment shown in FIG. 4, the wind power system is installed vertically, directly in front of the air outlets of the blowers 8.

Figure 6:
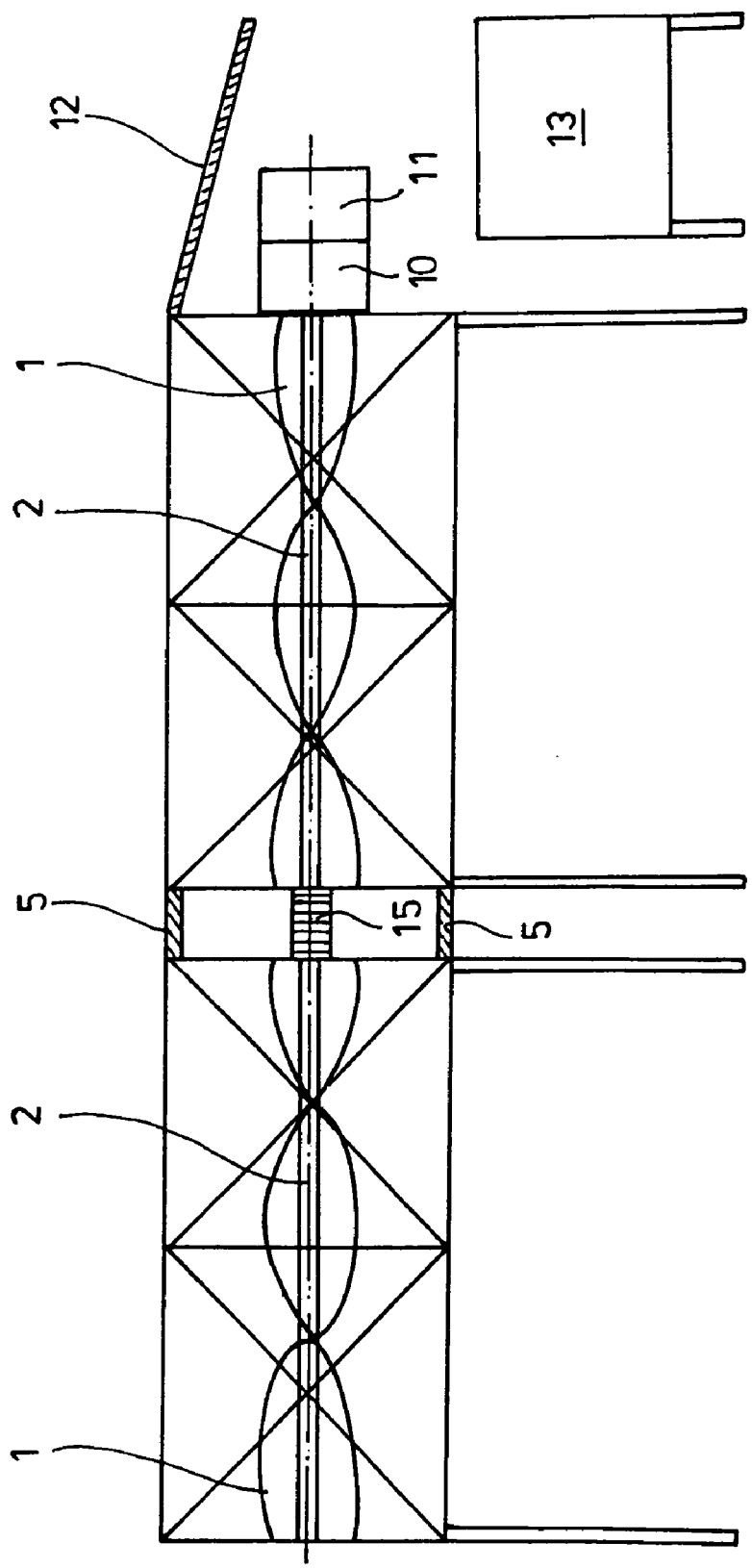
FIG. 6 shows a schematic diagram of the connection between a wind converter and a support housing for creating a larger wind power system.

As shown in the embodiment according to FIG. 6, the energy generated by the use of the wind power system can be supplemented by providing a photovoltaic unit 12. The photovoltaic unit 12 can be installed directly on the wind power system or near the wind power system. There are several possible variants for the use of the photovoltaic unit 12. First, the power provided by the photovoltaic unit 12 can be used to power the blowers 8. In particular during the periods when the condenser unit of the connected air-conditioning system is not being used. In addition, natural wind movements or thermally generated air flows can also be guided to the wind converter 1.

A device 13 for storing energy can be provided near the wind power system. The storage unit 13 can be designed as a battery or as a hydrogen generator. During times when the blowers 8 are not being used, the energy 13 contained in the storage unit 13 can be used to operate the system. The energy currently being generated but not actually needed, can also be sent to the storage unit 13. According to another embodiment of the invention, it is possible to use the energy of the storage unit (13) to supply the blowers (18) and so to effect an operation of the generator (11) on a basic operation level.

The wind power system is preferably of modular construction. In particular, it becomes possible, in correspondence with the embodiment shown in FIG. 6, to operate a plurality of modules in parallel or in series. The individual modules can be connected to each other by couplers 15. By connecting several modules together, it becomes possible to produce more power and thus to generate more electrical energy.

While specific embodiments of the invention have been shown and described in detail to illustrate the inventive principles, it will be understood that the invention may be embodied otherwise without departing from such principles.

I claim:

1. An apparatus for generating electrical energy, the apparatus comprises at least one generator connected to a drive device, the drive device comprising a wind converter for transforming energy contained in a flowing medium into a rotational movement, wherein the wind converter has a rotatable horizontal axle supported in at least two bearings and is arranged in a flow path of heated exhaust air emanating from at least one heat exchanger, wherein the wind converter is constructed as a Darrieus rotor and/or a Savonius rotor that is driveable by wind and thermal updrafts, wherein the at least one heat exchanger is part of an air-conditioning system equipped with at least one blower, wherein the wind converter is driven by the movement of the air produced at least partially by the at least one blower.

2. The apparatus according to claim 1, wherein the wind converter is arranged vertically above the heat exchanger.

3. The apparatus according to claim 1, wherein the wind converter is arranged vertically next to the heat exchanger.

4. The apparatus according to claim 1, wherein the wind converter is arranged vertically above and also laterally offset from the heat exchanger and is connected to the heat exchanger by a stand.

5. The apparatus according to claim 1, wherein a gearbox (10) is arranged between the generator (11) and the drive device.

6. The apparatus according to claim 5, wherein the gearbox (10) comprises a speed ratio for connecting a slow-turning drive device to a fast-turning generator.

7. The apparatus according to claim 1, wherein the apparatus comprises a photovoltaic system (12).

8. The apparatus according to claim 1, wherein a modular design is realized.

9. The apparatus according to claim 1, comprising at least two modules for generating electrical energy, wherein the modules are connected to each other.

10. The apparatus according to claim 1, wherein the apparatus comprises an energy storage unit (13).

11. The apparatus according to claim 10, wherein the storage unit (13) is configured to store electrical energy.

12. The apparatus according to claim 10, wherein the storage unit (13) is configured to generate and to store hydrogen.

* * * * *